Sept. 10, 1935.  J. C. HART  2,014,175

PLANT PROTECTOR

Filed March 5, 1934

John C. Hart
INVENTOR.

BY J. Vincent Martin
ATTORNEY.

Patented Sept. 10, 1935

2,014,175

UNITED STATES PATENT OFFICE 2,014,175

PLANT PROTECTOR

John C. Hart, Houston, Tex.

Application March 5, 1934, Serial No. 714,073

1 Claim. (Cl. 47—28)

This invention relates to plant protectors.

It has for its general object the provision of a simple, inexpensive device for the protection of plants from frost, cold winds, and the like.

A specific object of the invention is to provide a plant protector, including a frame and a hood, the former of which may be left in place about the plant at all times, the latter of which may be quickly and easily applied to the former, when needed, to the end that the plant will be normally given the desired exposure to the sun and air, and will be covered only during certain intervals to protect it against the injurious effect of frost, cold winds and the like, and yet permit proper ventilation.

Another specific object is to provide a device of this character including a frame and hood, each of which may be quickly and easily collapsed for shipment or storage in a small space.

Other objects will hereinafter appear.

Figure 1:
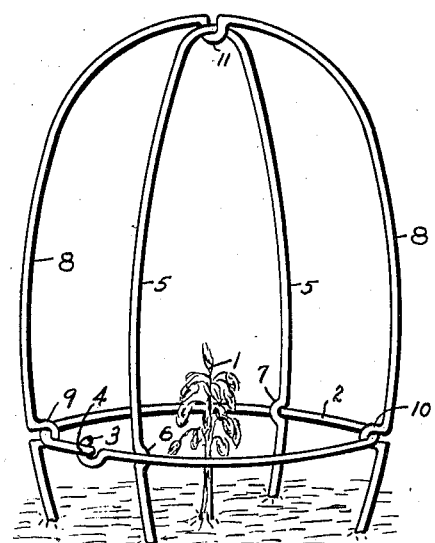
Figure 2:
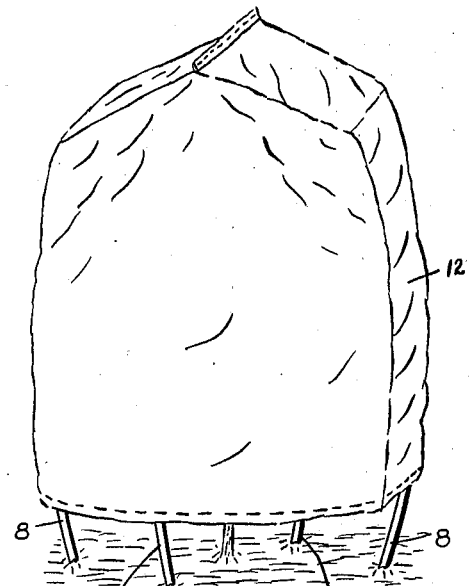
Figure 3:
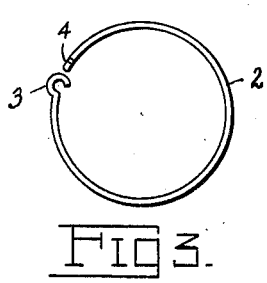
Figure 4:
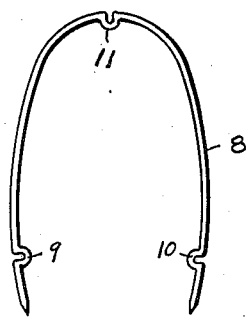
Figure 5:
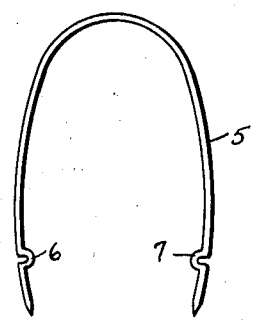
Figure 6:
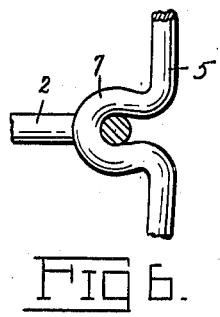

The preferred embodiment of the invention is illustrated by the accompanying drawing, wherein Fig. 1 is a view of the frame about the plant; Fig. 2 a view of the frame with the hood thereon about the plant; Figs. 3, 4, and 5, detail views illustrating the elements of the frame; Fig. 6, a detail view illustrating a crimp in the frame wire whereby the parts are releasably held together; and Fig. 7, a detail view illustrating the engagement of the frame by the cuff on the hood, whereby the latter is held in place.

In the drawing the numeral 1 indicates the plant to be protected. The protector includes a frame made of three wires which for convenience in illustration, will be referred to as "first", "second" and "third" wires. The numeral 2 indicates the first wire which is bent into a circular shape and has hooked ends 3 and 4 adapted to releasably engage each other. The second wire is indicated by the numeral 5. It is bent into a substantially inverted U shape, the legs of the U being inwardly crimped, as indicated at 6 and 7 to receive and yieldably hold the first wire 2 as shown in detail by Fig. 6. The third wire is indicated at 8. It is shaped like the second wire 5 and its legs are also inwardly crimped as indicated at 9 and 10; and its base is downwardly crimped as indicated at 11 for the reception of the second wire 5.

The wires of the frame just described are preferably of galvanized resilient steel. The frame may be assembled by placing the second and third wires, 5 and 8, at substantially a right angle to each other so that the second wire 5 is held by the crimp 11 of the third wire 8. The first wire 2 may then be placed about the second and third wires so that it enters the crimps 6, 7, 9, and 10, and the hooks 3 and 4 may then be engaged to hold the parts in place. Because of the resiliency of the wires, the frame will be rigid and the legs of the wires 5 and 8 may then be forced into the earth about the plant 1. The frame does not interfere with the proper exposure of the plant to the sun and atmosphere, and it may therefore be left in place at all times.

Figure 7:
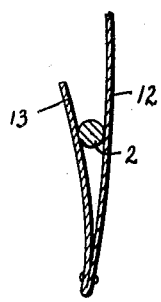

In Figs. 2 and 7 the numeral 12 indicates a hood in the form of a bag having an inwardly and upwardly presented cuff 13. It may be made by folding canvas, cloth or paper into the shape of a bag and securely fastening the top and sides either by sewing, glue or staples. Vegetable parchment paper, due to its water resistant properties has been found suited to this purpose. When the hood 12 is slipped over the frame, its cuff 13 engages the first wire 2 so that the hood is held securely in place. It is preferable to assemble the parts so that the lower end of the hood is just in contact with the ground. This permits ventilation and thereby prevents "sweating" of the plant.

Many advantages of this invention will be apparent. It will be found particularly useful to truck farmers, because at the beginning of the trucking season the parts of the frame may be quickly and easily assembled without the use of tools and by unskilled persons, and placed about the plants to be protected.

The frames will not interfere with the growth of the plant because they do not interfere with the exposure thereof to the sun and air. During the periods when danger of frost exists, the hood may be applied to the frames and removed therefrom as soon as such danger has passed, and at the end of the trucking season, or at any other proper time, the frames may be removed from the plant, collapsed and stored for future use.

I claim:

A plant protector including a frame comprising a first wire bent into a substantially circular shape and having hooked ends constructed to releasably engage each other; a second wire bent into a substantially inverted U shape, the legs of the U being inwardly crimped to receive and releasably hold said first wire; a third wire bent into a substantially inverted U shape, the legs of the U being inwardly crimped to receive and releasably hold said first wire, and the base of the U being downwardly crimped to receive and releasably hold said second wire; said three wires being arranged substantially at right angles to each other, and said first wire being a substantial distance from the extremities of said second and third wires; and a hood fitting over said wires and having an inwardly and upwardly extending cuff to releasably engage said first wire, whereby said hood is held on said frame.

JOHN C. HART.